United States Patent
Walston (10) Patent No.: US 9,749,179 B2
(45) Date of Patent: Aug. 29, 2017

(54) FAST INITIALIZATION OF MULTI-MODE DEVICES

(75) Inventor: Robert Allen Walston, Sandy Springs, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 507 days.

(21) Appl. No.: 12/993,511

(22) PCT Filed: May 29, 2009

(86) PCT No.: PCT/US2009/045682
§ 371 (c)(1),
(2), (4) Date: Jan. 11, 2011

(87) PCT Pub. No.: WO2009/146426
PCT Pub. Date: Dec. 3, 2009

(65) Prior Publication Data
US 2011/0167463 A1    Jul. 7, 2011

Related U.S. Application Data

(60) Provisional application No. 61/057,312, filed on May 30, 2008.

(51) Int. Cl.
*H04N 7/173* (2011.01)
*H04L 12/24* (2006.01)
*H04L 12/28* (2006.01)

(52) U.S. Cl.
CPC ...... *H04L 41/0806* (2013.01); *H04L 12/2801* (2013.01)

(58) Field of Classification Search
CPC ......... H04N 21/42676; H04N 21/6118; H04N 21/6168; H04N 7/17309; H04B 1/71; H04B 1/7107; H04B 7/216
USPC ......... 725/111, 118, 126, 129; 370/250, 252, 370/485–487; 375/222
See application file for complete search history.

(56) References Cited

U.S. PATENT DOCUMENTS

| | | | | |
|---|---|---|---|---|
| 2002/0144285 A1* | 10/2002 | Ovadia | ......................... | 725/111 |
| 2003/0021237 A1* | 1/2003 | Min et al. | ..................... | 370/252 |
| 2005/0076385 A1* | 4/2005 | Li et al. | ........................ | 725/111 |
| 2005/0198685 A1* | 9/2005 | Walston | ........................ | 725/111 |
| 2006/0015918 A1* | 1/2006 | Walston | ........................ | 725/111 |
| 2006/0256799 A1* | 11/2006 | Eng | ................................ | 370/401 |
| 2008/0089362 A1* | 4/2008 | Ezra et al. | .................... | 370/493 |
| 2008/0120713 A1* | 5/2008 | Lo et al. | ......................... | 726/10 |
| 2011/0271313 A1* | 11/2011 | Urban et al. | .................. | 725/109 |

FOREIGN PATENT DOCUMENTS

WO    2009/146426 A1    12/2009

* cited by examiner

*Primary Examiner* — Jason Salce
(74) *Attorney, Agent, or Firm* — Bart A. Perkins (57) ABSTRACT

Systems and methods for initializing a dual mode device can use a network type flag to determine whether a network type is set. The dual mode device can initialize using a network type corresponding to the network type flag. In some implementations, if the network type is incorrect, the dual mode device can update the network type flag and restart the dual mode device.

19 Claims, 5 Drawing Sheets

FAST INITIALIZATION OF MULTI-MODE DEVICES

CROSS-REFERENCE TO RELATED APPLICATIONS

This application claims priority under 35 U.S.C. §119(e) to the filing date and benefit of International Application Serial No. PCT/US09/45682, entitled "Fast Initialization of Multi-Mode Devices," filed May 29, 2009, which claims priority to U.S. Provisional Patent Application Ser. No. 61/057,312, entitled "DOCSIS/EuroDOCSIS Fast Initialization," filed May 30, 2008, both of which are incorporated herein by reference as if set forth herein in their entirety.

TECHNICAL FIELD

The present disclosure relates generally to initializing a multi-mode device.

BACKGROUND

The Data-Over-Cable Service Interface Specification (DOCSIS) has been established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In transporting downstream multimedia content, as well as data, upstream messages are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user's device via a coaxial cable. Such an arrangement is known in the art as a hybrid fiber coax network (HFC).

Network interface devices, such as cable modems, are one manner in which the MSOs meet the demand for increased bandwidth capabilities in delivering information from a central location, such as a headend, over the HFC networks to users, such as residential and commercial end users.

Dual mode cable modems, for example, are designed to be used in either DOCSIS or EuroDOCSIS environments. These dual mode cable modems can be used to reduce inventory demands for two separate types of modems, and the associated costs of maintaining and deploying separate sets of inventory. Dual mode cable modems can operate using either the 6 MHz North American DOCSIS frequency allocation plan or an 8 MHz EuroDOCSIS frequency allocation plan. When placing a dual mode cable modem in service, the cable modem initially has no way of identifying whether it is deployed in a North American DOCSIS system or a EuroDOCSIS system, or even whether it has been re-deployed from one to the other.

Additionally, dual mode cable modems include both North American DOCSIS and EuroDOCSIS baseline privacy interface (BPI) certificates. BPI certificates provide a data encryption scheme to protect data sent to and from cable modems in a DOCSIS or EuroDOCSIS system. This data encryption gives cable subscribers data privacy across the RF network between cable modem termination systems (CMTS) at the headend and the cable modem at the customer site. BPI certificates are chained to a different type authority depending on whether they are used in a North American DOCSIS system or a EuroDOCSIS system. The dual mode cable modem must determine which standard is in use so as to use the correct certificates.

Accordingly, there is a need for initialization of a dual mode cable modem that can recognize which type system it is deployed in, whether DOCSIS or EuroDOCSIS, and for quickly re-initializing itself upon determination that it is set up for BPI certificates that do not match the system in use by the headend cable plant.

SUMMARY

Briefly described, and according to an example implementation, this disclosure describes systems and methods for initialization of dual mode cable modems for DOCSIS and EuroDOCSIS operation. One example method of initializing a dual mode cable modem can include: supplying power to the multi-mode device; retrieving a network type flag from a nonvolatile memory of the multi-mode device; operating the multi-mode device using a corresponding network type, wherein the corresponding network type is indicative of at least one of a first network type or a second network type.

An example dual mode cable modem system can include a nonvolatile memory and an initialization module. The nonvolatile memory can be configured to store configuration information, including a network type flag and a downstream channel frequency. The initialization module can be configured to retrieve the network type flag from the nonvolatile memory, and to set the dual mode cable modem to use a first network type or a second network type based upon the retrieved network type flag.

Other systems, methods, features and advantages of the present disclosure will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many details of the disclosure can be better understood with reference to the following drawings. The components in the drawings are not necessarily to scale, emphasis instead being placed upon clearly illustrating the principles of the present disclosure.

DETAILED DESCRIPTION

Reference is now made in detail to the description of the embodiments of systems and methods for initializing a dual mode cable modem to either DOCSIS or EuroDOCSIS operations as illustrated in the accompanying drawings. The disclosure may, however, be embodied in many different forms and should not be construed as limited to the embodiments set forth herein; rather, these embodiments are intended to convey the scope of the disclosure to those skilled in the art. Furthermore, all examples given herein are intended to be non-limiting.

Figure 1:
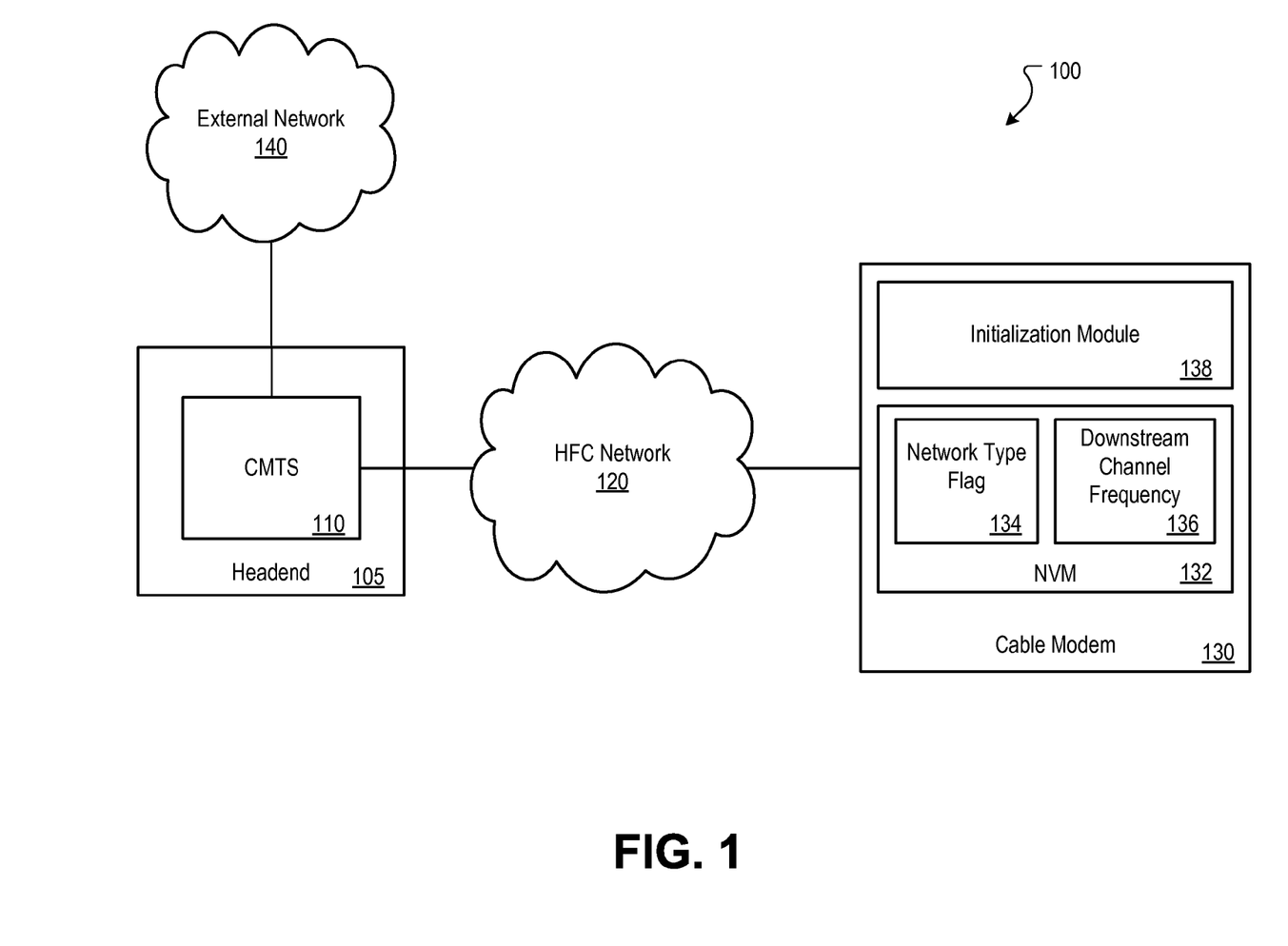
FIG. 1 is a block diagram illustrating a system for initializing a dual mode cable modem to either DOCSIS or EuroDOCSIS operations.

FIG. 1 is a block diagram illustrating a network environment 100 into which a multi-mode device (e.g., a dual mode cable modem 130) can be deployed for initialization using DOCSIS or EuroDOCSIS standards. A dual mode cable modem 130 can send communications to an edge termination system (e.g., cable modem termination system (CMTS) 110) residing at a headend 105. The dual mode cable modem 130 can be connected to the headend through a hybrid fiber-coax (HFC) network 120. The CMTS 110 can provide a path for communications to an external network 140 (e.g., the Internet), and/or to other network and information sources.

The dual mode cable modem 130 supports both 6.0 MHz DOCSIS and 8.0 MHz EuroDOCSIS operation. Thus, these dual mode cable modems 130 include both DOCSIS (commonly used in North America as well as other locations including parts of Europe) and EuroDOCSIS standards. The dual mode cable modems can include the ability to use baseline privacy interface (BPI) certificates for both standards, but do not know which to use until they identify a type of network to which they are connected.

DOCSIS includes MAC layer security services in its BPI certificate specifications. The BPI certificate specifications describe MAC layer security services for DOCSIS CMTS-to-CM communications. Data privacy can be provided to cable modem users across the HFC network 120. Additionally, cable service operators can use features of the standards to protect the network. Such features can include services operable to prevent unauthorized users from gaining access to the network's RF MAC services.

Cable users can encrypt communications between the CMTS and the cable modem, thereby inhibiting other users from eavesdropping on the encrypted communications. This data encryption gives cable subscribers data privacy across the RF network between the CMTS 110 and the dual mode cable modem 130. BPI certificates can provide a data encryption scheme to protect data sent to and from cable modems in DOCSIS and EuroDOCSIS systems. However, BPI certificates can be linked to different types of encryption mechanisms depending on whether they are used in a DOCSIS system or a EuroDOCSIS system. Thus, the dual mode cable modem 130 can determine which cable plant is in use to facilitate identification of the type of BPI certificate to use.

In some implementations, upon initial start-up, or boot, the dual mode cable modem 130 can assume EuroDOCSIS operation. After identifying a downstream channel frequency characteristic (e.g., a downstream channel frequency width), the dual mode cable modem 130 can determine whether the default start-up values are correct. If the start-up values are not correct, then the dual mode cable modem 130 can correct a network type flag in the nonvolatile memory, and store the identified downstream channel frequency characteristic. The cable modem can then perform a full or partial restart. A partial restart can include bypassing some startup operations, such as, e.g., a memory check. Upon restart, the dual mode cable modem 130 can retrieve the correct values from the nonvolatile memory and initializes more quickly to the correct network type and downstream channel frequency characteristics, as well as identifying a BPI certificate for use on the network (e.g., based upon the network type).

The dual mode cable modem 130 can include a nonvolatile memory 132 and an initialization module 138. The nonvolatile memory 132 and initialization module 138 can be used to facilitate the initialization of the dual mode cable modem 130 into a configuration (e.g., DOCSIS or EuroDOCSIS). The initialization module can include software logic configured to initialize the dual mode cable modem 130. The initialization logic, for example, can be implemented in a separate physical module as in FIG. 1, or included within other code portions. A typical dual mode cable modem 130 can operate on a DOCSIS network or a EuroDOCSIS network. In either instance the network headend can include a CMTS 110 used to provide downstream bandwidth to the dual mode cable modem 130.

In some implementations, the nonvolatile memory 132 can include a network type flag 134 and a downstream channel frequency 136 value. The network type flag 134 can identify which type of network and frequency allocation plan is used on a connected network. Moreover, the type of certificate, certificate authority or encryption type used on a DOCSIS network or EuroDOCSIS network can vary. For example, North American certificate authorities can differ from European authorities. In North America, the dual mode cable modem 130 is typically configured for DOCSIS certificate authority(ies), while in parts of Europe, the dual mode cable modem 130 is typically configured for EuroDOCSIS certificate authority(ies). Additionally, some parts of Europe utilize DOCSIS as well as EuroDOCSIS standards. The initialization module 138 can use the parameters stored in the nonvolatile memory 132 for initializing the dual mode cable modem 130.

In some implementations, the dual mode cable modem 130 can read the network type flag 134 at startup (e.g., power-up) to determine which network type and/or certificate to use. On an initial startup, the network type flag 134 or a prior configuration flag can be set to a default value, indicating that no value has yet been stored. In this default condition on initial startup, the dual mode cable modem 130 can be set by default to use the EuroDOCSIS standard. In other implementations, the default boot condition can be set to DOCSIS operation. If the network type flag 134 or prior configuration flag has been previously set, the dual mode cable modem 130 can operate using the network standard that corresponds to the network type flag 134. For example, if during previous operation, the dual mode cable modem 130 has been set for DOCSIS operation, the network type flag 134 will have been set accordingly. Upon boot, the dual mode cable modem 130 can check the network type flag 134 (or prior configuration flag), determine that it has been set for DOCSIS certificates, and then configure itself for DOCSIS operation.

In some implementations, the nonvolatile memory 132 can include a downstream channel frequency 136 parameter for storage of the downstream channel frequency value after it has been detected. Upon reading the network type flag 134, the dual mode cable modem 130 can use a downstream signal from the CMTS to identify a downstream channel frequency 136. For example, identifying the downstream channel frequency 136 can be done by scanning the frequencies in the frequency allocation plan associated with the type of network identified by the network type flag 134. Upon identifying a downstream channel frequency 136, the dual mode cable modem 130 can be set to that channel frequency and determine whether the detected downstream channel frequency width corresponds to the network type flag 134. For example, if the network type flag 134 indicates DOCSIS operation, the dual mode cable modem 130 can expect to detect a downstream channel frequency 136 of 6.0 MHz. Alternatively, if the network type flag 134 indicates EuroDOCSIS operation, the dual mode cable modem 130 can expect to detect a downstream channel frequency 136 of 8.0 MHz.

If the network type flag 134 does not match with the downstream channel frequency width, the network type flag 134 can be updated to match the identified downstream channel frequency width. Moreover, the downstream channel frequency 136 can be updated to the identified downstream channel frequency. Once the network type flag 134 and downstream channel frequency 136 are stored in the nonvolatile memory 132, the dual mode cable modem 130 can be restarted. In various implementations, the restart can be a full or partial restart. In those implementations where a partial restart is performed, the partial restart can exclude some startup operations (e.g., testing the memory). In some implementations, the actual downstream channel frequency 136—in addition to or instead of the channel width—can be stored in the nonvolatile memory prior to restarting the dual mode cable modem 130. Thus, when restarting the dual mode cable modem 130 to switch the operating mode (e.g., from EuroDOCSIS to DOCSIS or vice-versa), the dual mode cable modem 130 goes directly to the CMTS downstream channel frequency 136. A restart based on this procedure can reduce the delays caused by performing a full rescan of the available frequency spectrum.

In alternative implementations, some stages of initialization can be skipped. For example, if the first start indicates that the dual mode cable modem 130 is operating using an incorrect network type, the restart can be configured to skip testing to ensure that the network type indicated by the network type flag 134 corresponds to a measured downstream channel frequency width. Thus, for example, the second initialization can avoid identifying the downstream channel frequency width and comparing it to an expected downstream channel frequency width 136 stored in NVM 132.

Figure 2:
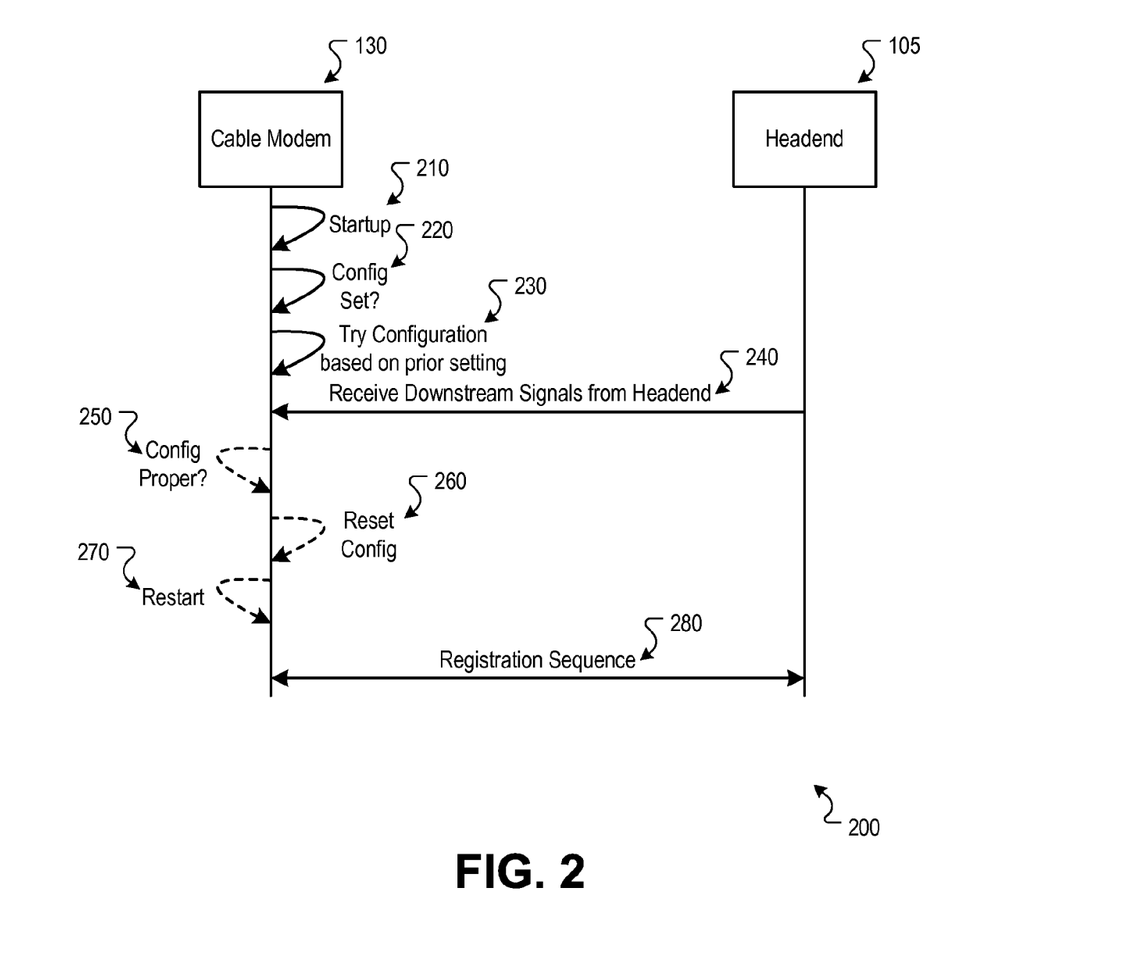
FIG. 2 is a flowchart illustrating a method for initializing a dual mode cable modem to either DOCSIS or EuroDOCSIS operations according to the system of FIG. 1.

FIG. 2 is a sequence diagram illustrating an initialization flow 200 to the initialization sequence of a dual mode cable modem 130. The initialization flow for the dual mode cable modem 130 can begin with startup (210). At startup, power can be supplied to the dual mode cable modem 130 and the dual mode cable modem 130 can begin the initialization process. The dual mode cable modem 130 can then check a data store to determine whether the network configuration has previously been set (220). If the configuration has been set, the dual mode cable modem 130 can use the stored network configuration information (230).

In various implementations, the stored network configuration information can include information about whether this is the first time the dual mode cable modem 130 has been powered up, and a network type flag indicating a type of network to which the dual mode cable modem 130 was previously connected. Alternatively, if the dual mode cable modem has not previously been powered up or connected to the network, the network type flag can be set (e.g., by a manufacturer of the dual mode cable modem) to identify a default network type. The stored configuration information, in some implementations, can also include a downstream channel frequency and/or a downstream channel frequency width. Such values can be stored as part of the network type flag. Alternatively, these values can be stored as part of the network configuration information.

The dual mode cable modem 130 can begin to receive downstream signals from a headend 105 (e.g., through a CMTS device) (240). The received downstream signals can be optionally analyzed to identify whether the previously set configuration is a proper configuration (250). In various implementations, the downstream channel frequency and/or the downstream channel frequency width can be identified and compared to the configuration information. If the measured downstream channel frequency or measured downstream channel frequency width do not correspond to the configuration information (e.g., the network type flag and/or the stored downstream channel frequency or stored downstream channel frequency width), the stored configuration information optionally can be updated to correspond to the measured downstream channel frequency or measured downstream channel frequency width and corresponding network type (260).

After updating the configuration information and storing the updated configuration information to a data store, optionally the dual mode cable modem 130 can be restarted (270). In some implementations, the dual mode cable modem 130 can do a full restart (e.g., memory check, set to the stored configuration information and confirmation of the stored configuration information). In other implementations, the dual mode cable modem 130 can be configured to perform a soft restart after determining that the previously stored configuration information is incorrect. The soft restart can skip some steps of the startup process or some portions of the flow 200. For example, the soft restart can skip the memory check, since the memory check was performed on the prior startup. Additionally, in some examples, the dual mode cable modem 130 might be configured to skip the step of confirming the configuration is proper, if a soft restart is being performed after determining that the previously stored configuration information was incorrect. Such soft restart can facilitate faster initialization. After initialization is complete, the dual mode cable modem 130 can begin a registration sequence with the headend 105.

Figure 3:
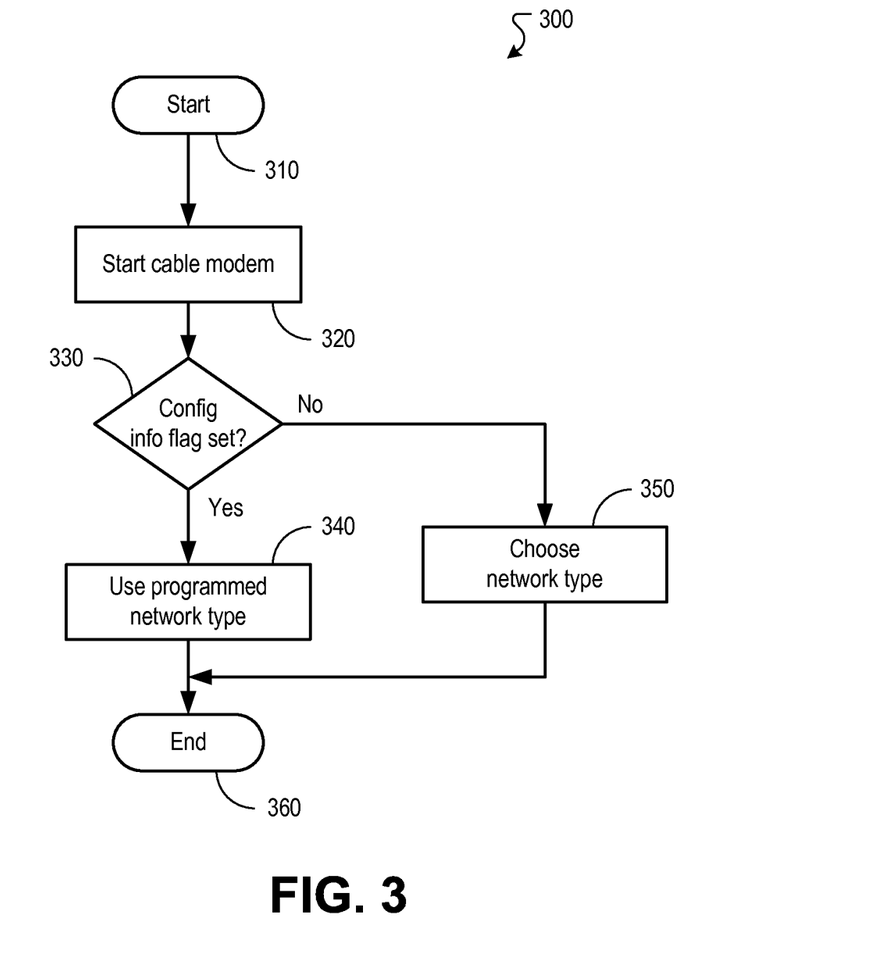
FIG. 3 is flowchart illustrating an example process used to initialize a dual mode cable modem.

FIG. 3 is flowchart illustrating an example process 300 for initializing a dual mode cable modem. The process 300 can start at stage 310. At stage 320, a dual mode cable modem is started up. The dual mode cable modem can be started, for example, by providing power to the dual mode cable modem device.

At stage 330, the process 300 determines whether a configuration information flag is set. The configuration information flag can be set, for example, by a processing device in conjunction with a data store for the dual mode cable modem. In some implementations, the network type flag can include information about whether the dual mode cable modem has been previously initialized, as well as network type information indicating a type of network to which the cable modem was previously connected if it had been previously initialized. In additional implementations, when the dual mode cable modem has been previously initialized, the configuration information flag can include information about a downstream signal (e.g., a channel frequency and/or channel frequency width).

If the configuration information flag is set, the process 300 continues by using a programmed network type at stage 340. The programmed network type can be based, for example, on configuration information included in the configuration information flag. The configuration information can be read by a processing device in conjunction with a data store for the dual mode cable modem. The processing device can then instruct an interface device (e.g., a modulator or RF generator) to use a specified frequency. The process 300 then ends at stage 360.

If the configuration information flag is not set, the process 300 continues by choosing a network type at stage 350. The network type can be chosen, for example, by a default value stored with the configuration information and set by a manufacturer or other distributor of the dual mode cable modem device. In other implementations, the network type can be chosen randomly by a processing device. In still further implementations, the network type can be chosen based upon some other algorithm chosen to select a network type. The process 300 ends at stage 360.

Figure 4:
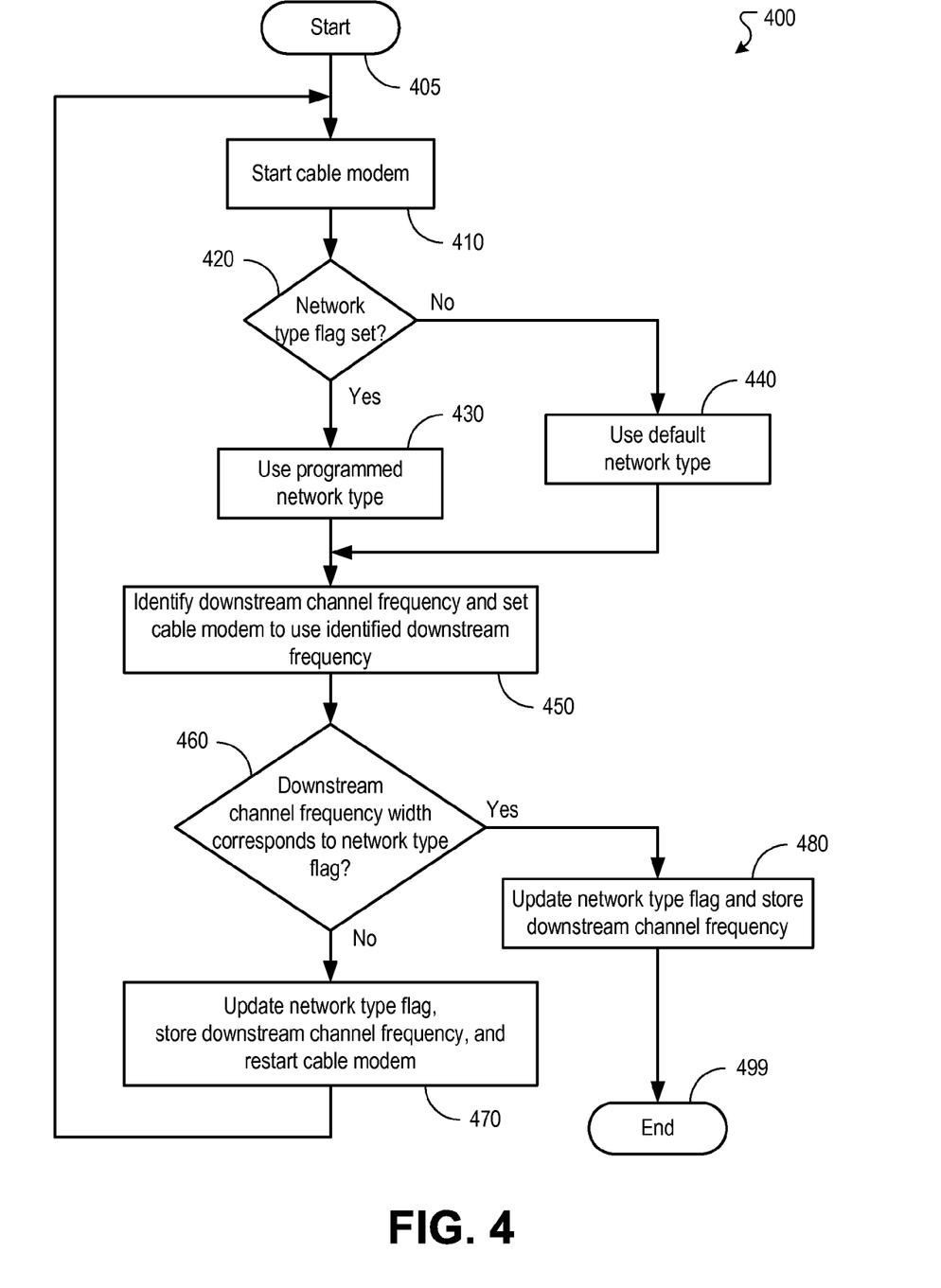
FIG. 4 is a flowchart illustrating another example process used to initialize a dual mode cable modem.

FIG. 4 is a flowchart illustrating a method 400 used to initialize a dual mode cable modem to either DOCSIS or EuroDOCSIS operation. The dual mode cable modem starts up at stage 405. During an initial start-up, the dual mode cable modem does not have configuration information identifying whether it is connected to a DOCSIS type network or to a EuroDOCSIS type network.

At stage 420, the dual mode cable modem can determine whether the network type flag has been set. In some implementations, if the network type flag has no value, then the dual mode cable modem can assumes EuroDOCSIS operation at stage 440. If the network type flag has a value, then the dual mode cable modem uses the programmed network type at stage 430, as specified by the network type flag.

At stage 450, the dual mode cable modem identifies a downstream channel frequency based upon a downstream signal that originates from the CMTS. The CMTS can be located at a headend facility and can be connected to the dual mode cable modem through an HFC network. Once a downstream channel frequency is identified, the dual mode cable modem can be set to that frequency. It should be noted that the identification of a downstream channel frequency can include checking any downstream channel frequencies that have been stored in the nonvolatile memory. If no downstream channel frequency is available in the nonvolatile memory, or if the dual mode cable modem is unable to set to use a previously saved frequency value, then a modem scan can be performed using the CMTS signal.

After identifying a downstream channel frequency, a determination can be made whether the dual mode cable modem is using the correct network type. This determination, at stage 460, can depend on whether a measured downstream channel frequency width corresponds to the frequency width specified by the network type that is in use according to the network type flag. If the downstream channel frequency width matches the set network type, then at stage 480, the value of the downstream channel frequency is stored in the nonvolatile memory for use on the next reboot.

If the frequency width of the measured downstream channel frequency does not correspond to the network type, it is an indication that an incorrect network type has been specified. Then at stage 470, the measured values for the downstream channel frequency and corresponding network type are stored in the nonvolatile memory. Specifically, the network type flag can be updated, the detected downstream channel frequency is stored, and the dual mode cable modem is restarted.

Upon restarting, the network type is detected at stage 420 as has having been set. Thus, the dual mode cable modem initializes with the updated network type at stage 430. Storing the detected downstream channel frequency can hasten the process identifying the downstream channel frequency at step 450. Thus the overall initialization process can be performed more efficiently.

Because the dual mode cable modem compares the downstream channel width against the stored network type every time it is set to a downstream channel frequency, redeployment to a new network can be handled automatically. Once the network type in use correctly corresponds to the detected downstream channel frequency, the dual mode cable modem is correctly initialized.

Figure 5:
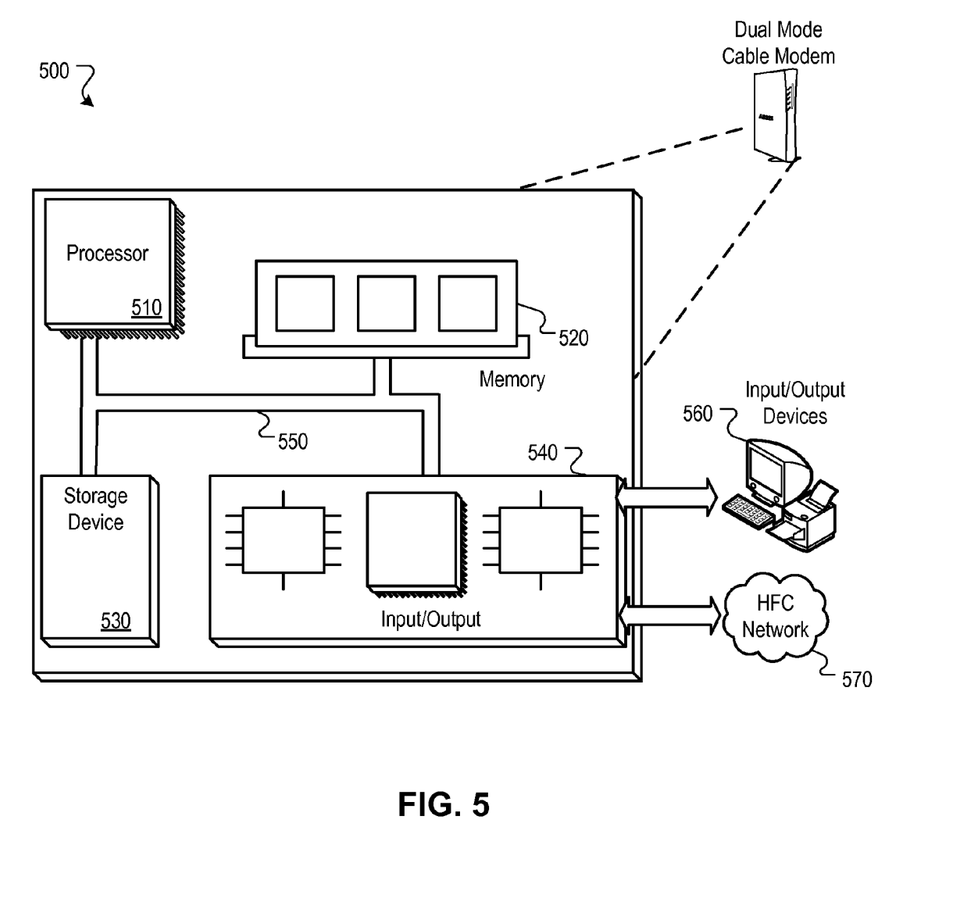
FIG. 5 is block diagram of an example dual mode cable modem.

FIG. 5 is block diagram of an example dual mode cable modem 500. The dual mode cable modem 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the dual mode cable modem 500. In one implementation, the memory 520 is a computer-readable medium. In one implementation, the memory 520 is a volatile memory unit. In another implementation, the memory 520 is a non-volatile memory unit.

The storage device 530 is capable of providing storage for the dual mode cable modem 500. In one implementation, the storage device 530 is a computer-readable medium. In various different implementations, the storage device 530 can, for example, include a hard disk device, an optical disk device, or a flash memory device.

The input/output device 540 provides input/output operations for the dual mode cable modem 500. In one implementation, the input/output device 540 can include one or more of a network interface devices and RS-232 port, and/or a wireless interface device, e.g., and 802.11 card. In another implementation, the input/output device can include driver devices configured to receive input data and send output data to other input/output devices, e.g., a computer 560 or other network device (e.g., hub, bridge, router, etc.) and an HFC network 570. Other implementations, however, can also be used, such as mobile computing devices, mobile communication devices, set-top box television client devices, etc.

The fast initialization process for a dual mode cable modem, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer implemented method for initializing a multi-mode device, the method comprising:
   a. supplying power to the multi-mode device;
   b. retrieving a network type flag from a nonvolatile memory of the multi-mode device, wherein the network type flag identifies a first network type;
   c. operating the multi-mode device using one or more configuration parameters associated with the first network type;
   d. identifying a downstream channel frequency characteristic based upon a downstream signal that originates from an edge termination system;
   e. upon a determination that the downstream channel frequency characteristic does not correspond with a downstream channel frequency associated with the first network type:
      i. updating the network type flag in the nonvolatile memory with an updated network type flag, wherein the updated network type flag identifies a second network type;
      ii. restarting the multi-mode device; and
      iii. operating the multi-mode device using one or more configuration parameters associated with the second network type.

2. The computer-implemented method of claim 1, further comprising:
  a. identifying a downstream channel frequency characteristic, wherein an identified downstream channel frequency characteristic is part of a downstream signal that originates from an edge termination system;
  b. setting the multi-mode device to use the identified downstream channel frequency characteristic; and
  c. upon determination that the downstream channel frequency characteristic does not correspond to the network type flag that is in use:
    i. updating the network type flag in the nonvolatile memory, wherein the updated network type flag corresponds to the identified downstream channel frequency characteristic; and
    ii. restarting the multi-mode device.

3. The computer-implemented method of claim 2, further comprising: upon determination that the downstream channel frequency characteristic does not correspond to the network type flag that is in use, and prior to rebooting the multi-mode device, storing the identified downstream channel frequency characteristic in the nonvolatile memory.

4. The computer-implemented method of claim 3, wherein the identified downstream channel frequency characteristic comprises a downstream channel frequency width.

5. The computer-implemented method of claim 1, further comprising:
  a. upon determination that the network type flag is not set, operating the multi-mode device using a default network type, the default network type comprising one of the first network type or the second network type.

6. The computer-implemented method of claim 1, wherein the network type flag comprises a network frequency allocation plan flag.

7. The computer-implemented method of claim 4, further comprising, upon determination that the downstream channel frequency width corresponds to the network type flag that is in use, storing the network type flag in the nonvolatile memory.

8. The method of claim 1, wherein the first and second network type are selected from a DOCSIS network type and a EuroDOCSIS network type.

9. A multi-mode device, comprising:
  a. a nonvolatile memory configured for storage of configuration information comprising a network type flag and a downstream channel frequency, wherein the network type flag is associated with a first network type; and
  b. an initialization module operable to: retrieve the network type flag from the nonvolatile memory, the initialization module being further operable to set the multi-mode device to use the first network type based upon the retrieved network type flag; identify a downstream channel frequency characteristic based upon a downstream signal that originates from an edge termination system; and upon a determination that the downstream channel frequency characteristic does not correspond with a downstream channel frequency associated with the first network type:
    i. update the network type flag in the nonvolatile memory with an updated network type flag, wherein the updated network type flag identifies a second network type;
    ii. restart the multi-mode device; and
    iii. operate the multi-mode device using one or more configuration parameters associated with the second network type.

10. The multi-mode device of claim 9, wherein the initialization module is further operable to determine whether the network type flag is set, the initialization module being further operable to select a network type if the network type flag is not set.

11. The multi-mode device of claim 10, wherein the initialization module is operable to randomly select a network type or use a default network type if the network type flag is not set.

12. The multi-mode device of claim 9, further comprising a verification module operable to identify of a downstream channel frequency characteristic originating from a headend, and is further operable to verify that that the downstream channel frequency characteristic corresponds to the network type flag.

13. The multi-mode device of claim 12, wherein the verification module is operable to store a new network type flag and restart the multi-mode device if the downstream channel frequency characteristic does not correspond to the network type flag.

14. The multi-mode device of claim 9, wherein the network type comprises a DOCSIS type network or a EuroDOCSIS type network and is used to identify a baseline privacy interface certificate to use on the network.

15. A computer-implemented method for initializing a cable modem, the method comprising:
  a. retrieving a network type flag from a nonvolatile memory of the cable modem, wherein the network type flag identifies a first network type;
  b. operating the cable modem using a corresponding baseline privacy interface certificate associated with the network type flag;
  c. measuring a downstream channel frequency characteristic;
  d. determining whether the measured downstream channel frequency characteristic matches an expected downstream channel frequency characteristic based upon the network flag type;
  e. if the measured downstream channel frequency characteristic does not match the expected downstream channel frequency characteristic, updating the network type flag, wherein the updated network type flag identifies a second network type;
  f. restarting the cable modem; and
  g. operating the cable modem using a baseline privacy interface certificate associated with the updated network type flag.

16. The computer-implemented method of claim 15, wherein updating the network type flag comprises updating the network type flag in the nonvolatile memory to correspond to the identified downstream channel frequency characteristic.

17. The computer implemented method of claim 15, further comprising, upon determining that the measured downstream channel frequency characteristic does not match the expected downstream channel frequency characteristic, storing the measured downstream channel frequency characteristic in the nonvolatile memory.

18. The computer-implemented method of claim 15, further comprising, upon determination that the measured downstream channel frequency characteristic matches the expected downstream channel frequency characteristic, storing the network type flag corresponding to the measured downstream channel frequency characteristic in the nonvolatile memory.

19. The computer-implemented method of claim 15, wherein the network type is a DOCSIS network type or a EuroDOCSIS network type, the DOCSIS network type being indicative of a first certificate authority and the EuroDOCSIS network type being indicative of a second certificate authority.

\* \* \* \* \*